United States Patent
Lee

(10) Patent No.: US 7,076,213 B2
(45) Date of Patent: Jul. 11, 2006

(54) APPARATUS AND METHOD FOR TESTING VOLTAGE STANDING WAVE RATIO IN A W-CDMA MOBILE COMMUNICATION SYSTEM

(75) Inventor: Jin-Su Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 559 days.

(21) Appl. No.: 10/396,809

(22) Filed: Mar. 26, 2003

(65) Prior Publication Data

US 2004/0203447 A1    Oct. 14, 2004

(30) Foreign Application Priority Data

Apr. 24, 2002  (KR) .................... 10-2002-0022578

(51) Int. Cl.
*H04B 17/00* (2006.01)
(52) U.S. Cl. .................. 455/67.14; 455/67.11; 455/115.1; 455/115.2; 455/226.1; 455/226.2; 455/121; 455/129; 324/645; 324/642; 324/646; 343/703; 375/224
(58) Field of Classification Search .............. 455/63.1, 455/67.11, 67.13–16, 67.7, 78, 80–83, 115.1–4, 455/117, 121, 124–126, 129, 226.1–4, 423–425; 324/637, 642, 645–647; 375/224–228, 219; 343/703, 822, 828
See application file for complete search history.

(56) References Cited

U.S. PATENT DOCUMENTS

| | | | | |
|---|---|---|---|---|
| 4,580,092 A | * | 4/1986 | Squire | 324/646 |
| 5,548,820 A | * | 8/1996 | Victorin | 455/67.14 |
| 6,151,482 A | * | 11/2000 | Eriksson | 455/67.11 |
| 6,178,310 B1 | * | 1/2001 | Jeong | 455/67.11 |
| 6,310,579 B1 | * | 10/2001 | Meredith | 343/703 |
| 6,313,644 B1 | * | 11/2001 | Kim et al. | 324/645 |
| 6,505,041 B1 | * | 1/2003 | Borgstrand | 455/423 |
| 6,525,545 B1 | * | 2/2003 | Hill | 324/642 |
| 6,603,810 B1 | * | 8/2003 | Bednekoff et al. | 375/228 |
| 6,704,352 B1 | * | 3/2004 | Johnson | 375/224 |
| 6,741,640 B1 | * | 5/2004 | Johnson | 375/219 |
| 2004/0152431 A1 | * | 8/2004 | Johnson | 455/130 |

* cited by examiner

*Primary Examiner*—Lee Nguyen
*Assistant Examiner*—Tuan Tran
(74) *Attorney, Agent, or Firm*—Roylance, Abrams, Berdo & Goodman, LLP

(57) ABSTRACT

An apparatus and method for testing a voltage standing wave ratio (VSWR) in a wideband code division multiple access (W-CDMA) mobile communication system. Upon detecting a VSWR test request, a controller determines an oscillation frequency information and a power level information of a test signal for a VSWR test, and generates a test signal generation request including the determined oscillation frequency information and power level information. Upon detecting the test signal generation request, a test signal generator generates a test signal corresponding to the oscillation frequency information and power level information, and provides the generated test signal to an antenna. A VSWR detector receives the test signal and a reflected signal of the test signal from the antenna, and calculates a VSWR using the received test signal and reflected signal.

12 Claims, 4 Drawing Sheets

APPARATUS AND METHOD FOR TESTING VOLTAGE STANDING WAVE RATIO IN A W-CDMA MOBILE COMMUNICATION SYSTEM

PRIORITY

This application claims priority under 35 U.S.C. § 119 to an application entitled "Apparatus and Method for Testing Voltage Standing Wave Ratio in a W-CDMA Mobile Communication System" filed in the Korean Industrial Property Office on Apr. 24, 2002 and assigned Serial No. 2002-22578, the contents of which are incorporated herein by reference.

BACKGROUND OF THE INVENTION

1. Field of the Invention

The present invention relates generally to a wideband code division multiple access (W-CDMA) mobile communication system, and in particular, to an apparatus and method for testing a voltage standing wave ratio (VSWR). More specifically, the present invention relates to an apparatus and method for testing the VSWR without affecting a call quality of the W-CDMA mobile communication system.

2. Description of the Related Art

In general, a code division multiple access (CDMA) mobile communication system is classified into a wideband CDMA (W-CDMA) mobile communication system and a narrowband CDMA (N-CDMA) mobile communication system based on the bandwidth used for a communication service. The W-CDMA mobile communication system and the N-CDMA mobile communication system both provide a communication service using high-frequency radio signals. Since the W-CDMA mobile communication system and the N-CDMA mobile communication system both use high-frequency radio signals to provide a communication service, the uniformity of a high-frequency transmission line is an important measure for determining the quality of the communication service. Typically, a voltage standing wave ratio (VSWR) is used as a criterion for determining the uniformity of the high-frequency transmission line. The VSWR is defined as a ratio of transmission signals transmitted in the form of voltage and current to a wave generated by reflected transmission signals when the high-frequency transmission line is non-uniform. That is, the VSWR is a type of return loss. As the VSWR becomes lower, the high-frequency transmission line becomes more uniform. For example, a VSWR of 1.2 represents a return loss of about −20 dB. In addition, a device for measuring the VSWR is generally called a "radio frequency (RF) monitor". The RF monitor selects one of an actual signal provided from a base station (BS) and a generated test signal in order to measure the VSWR. Herein, a description will be made of an apparatus and method for measuring a VSWR using the test signal in the case where an antenna front end unit (AFEU) for reception is used.

A description will now be made of a RF monitor, i.e., a VSWR measurement apparatus, with reference to FIG. 1.

FIG. 1 is a diagram illustrating an example of a general VSWR test apparatus. Referring to FIG. 1, a VSWR test apparatus 100 includes a test signal generator 111 for generating a test signal for a VSWR test, a VSWR detector 113 for detecting a VSWR according to the test signal, and a controller (not shown). Upon detecting a VSWR test request for testing the VSWR, the controller provides a test signal generation request signal to the test signal generator 111. In this case, the controller determines the oscillation frequency information and power level information, representing an oscillation frequency information and power level information, respectively, at which the test signal should be transmitted. Further, the controller generates the test signal generation request signal including the determined oscillation frequency information and power level information. In addition, the controller considers the following factors in determining the oscillation frequency information and power level information used for generation of the test signal.

The VSWR test apparatus 100 of FIG. 1 is an apparatus for testing VSWR in an N-CDMA mobile communication system. However, the N-CDMA mobile communication system employs a plurality of frequency assignments (FAs) for a communication service. Therefore, the controller detects a currently unemployed FA among the plurality of FAs, and controls the test signal generator 111 so that the test signal oscillates at a center frequency of the detected unemployed FA. As a result, the oscillation frequency information of the test signal generation request signal generated by the controller becomes the center frequency information of the currently unemployed FA. Further, in determining the power level information, the controller determines the power level information so that the generated test signal is higher by a prescribed level than the power level of signals received at the N-CDMA mobile communication system.

Upon receiving the test signal generation request signal, the test signal generator 111 detects the oscillation frequency information and the power level information included in the test signal generation request signal, and generates a test signal in response to the detected oscillation frequency information and power level information. The generated test signal includes a continuous wave (CW) format of single tones which correspond to the oscillation frequency information. Since the test signal generated by the test signal generator 111 must be transmitted via a first path to an antenna 160 and via a second path to the VSWR detector 113, the test signal generator 111 outputs the test signal through a first port which corresponds to the first path and a second port which corresponds to the second path. The test signal generated by the test signal generator 111 includes a single tone format, illustratively, represented by (3) of FIG. 1.

The test signal outputted through the first port is provided to a first port of an AFEU 150. The test signal outputted through the second port is provided to a second port of the AFEU 150. The AFEU 150 provides the test signal received through the first port to the antenna 160, and provides the test signal received through the second port to the VSWR detector 113 via a third port. The test signal provided to the antenna 160 is not fully transmitted. A portion of the signal is reflected due to a characteristic of a radio link. The reflected signal is provided to the VSWR detector 113 via the third port by the AFEU 150. The signal reflected from the antenna 160 is not fully provided to the VSWR detector 113 via the third port. Rather, a portion of the signal is provided to a reception terminal via a fourth port. A signal received through the antenna 160 has a continuous wave format of FAs, illustratively, represented by (1) of FIG. 1. Ideally, only the FAs received over the air through the antenna 160 must be provided to the reception terminal. However, as stated above, a part of the test signal for the VSWR test is provided to the reception terminal. Therefore, the FAs overlap with the test signal as, illustratively, represented by (2) of FIG. 1.

The VSWR detector 113 calculates a VSWR, using signals outputted at the third port of the AFEU 150, i.e., the test signal directly provided from the test signal generator 111 to the VSWR detector 113 and the test signal reflecting from the antenna 160 after being provided from the test signal generator 111 to the antenna 160.

Since the reflected test signal is not ideally fully provided to the VSWR detector 113 due to being partially provided to the reception terminal, a power level of the test signal must be determined for a power level of a received signal as stated above.

Now, with reference to FIG. 2, a description will be made of a form of signals used for a VSWR test described in conjunction with FIG. 1.

FIG. 2 is a graph illustrating an example of a VSWR test signal of FIG. 1. Referring to FIG. 2, a VSWR is tested on the assumption that an N-CDMA mobile communication system employs N FAs. Further, it will be assumed that among the N FAs, i.e., first to $N^{th}$ FAs $F_1$, to $F_N$, a fourth FA $F_4$ is currently unemployed. The test signal generator 111 then transmits a test signal $T_1$, for measuring the VSWR at a center frequency of the FA $F_4$. When the FAs include no currently unemployed FA, the test signal generator 111 transmits the test signal $T_1$, at a center frequency of a particular one of the FAs in use. Since the N-CDMA mobile communication system is generally used for voice communication, it is possible to transmit the test signal $T_1$, at the center frequency of the particular FA in employment. That is, in the case of voice communication, even though a voice data loss occurs, service quality is not fatally affected by the voice data loss. Further, if it is assumed as illustrated in FIG. 2 that received FAs have a power level of $P_1$ dB, the test signal $T_1$ has a power level of $P_2$ dB which is higher by a prescribed level than the $P_1$ dB, considering a noise component.

As described above, the N-CDMA mobile communication system oscillates a VSWR test signal at a center frequency of a current unemployed FA among its employed FAs, for a VSWR test. Alternatively, if there exists no currently unemployed FA, the N-CDMA mobile communication system oscillates the VSWR test signal at a center frequency of a particular FA currently in employment, for a VSWR test. However, when the test signal is oscillated at a center frequency of a currently employed FA as described in conjunction with the N-CDMA mobile communication system, a fatal error may occur in packet data that is nonvoice data. That is, the packet data suffers a loss due to transmission of the test signal. The loss of packet data disables normal data demodulation. However, since a W-CDMA mobile communication system generally provides a data service as well as a voice service, the system may be fatally affected when a test signal is oscillated at a center frequency of a currently employed FA as stated above. In addition, unlike the N-CDMA mobile communication system, the W-CDMA mobile communication system employs fewer FAs, for example, 4 FAs. Therefore, most of the FAs are actually employed for a communication service, so it is difficult to assign a currently unemployed FA for transmission of the test signal.

In addition, in the W-CDMA mobile communication system, a test signal for measuring the VSWR must be transmitted at a power level that satisfies the following three factors without affecting the actual quality of the communication service.

First, in the W-CDMA mobile communication system, consideration should be taken of a noise floor level of a signal received at an antenna of a Node B. For example, assuming that a noise floor level is −108 dBm/3.84 MHz in the W-CDMA mobile communication system, the test signal must be transmitted at a power level of over −129 dBm/30 kHz+20 dB (return loss)=−109 dBm/30 kHz in order to transmit the test signal at a power level higher than the noise floor level.

Second, in the W-CDMA mobile communication system, consideration should be taken of a peak power level of a signal received at a Node B receiver. For example, assuming that a peak power level of a signal received at a Node B receiver is −60 dBm/3.84 MHz in the W-CDMA mobile communication system, the test signal must be transmitted at a power level which is higher by at least −61 dBm/30 KHz than the peak power level of the received signal.

Third, in the W-CDMA mobile communication system, consideration should be taken of a data rate provided by a Node B. For example, in the case where a data rate provided by a Node B is 384 Kbps in the W-CDMA mobile communication system, sensitivity of a received signal is −106 dBm/3.84 MHz. In this case, if a resolution bandwidth (RBW) is set to 30 KHz, a power level of the test signal must be set to below −127 dBm/30 KHz in order not to interfere with transmission of other data.

However, a VSWR test apparatus used in an existing N-CDMA mobile communication system tests a VSWR without considering the above three factors, i.e., the power level consideration system, so the VSWR measurement of the W-CDMA mobile communication system, so the VSWR test apparatus is not proper for VSWR measurement of the W-CDMA mobile communication system. In addition, as described above, the VSWR test apparatus used in the existing W-CDMA mobile communication system generates a test signal at a frequency band of a currently unemployed FA among the employed FAs. However, in the case of the W-CDMA mobile communication system, the number of actual FAs is limited, so it is impossible to assign a currently unemployed FA for the VSWR test. Accordingly, there is a need for a new method of measuring a VSWR in the W-CDMA mobile communication system.

SUMMARY OF THE INVENTION

It is, therefore, an object of the present invention to provide an apparatus and method for measuring a VSWR in a W-CDMA mobile communication system.

It is another object of the present invention to provide an apparatus and method for measuring a VSWR without affecting the call quality in a W-CDMA mobile communication system.

It is further another object of the present invention to provide an apparatus and method for measuring a VSWR by considering a power level of a received signal in a W-CDMA mobile communication system.

To achieve the above and other objects, the present invention provides an apparatus for testing a VSWR in a W-CDMA mobile communication system. The apparatus comprises a controller adapted to determine, upon a detection of a VSWR test request, an oscillation frequency information and a power level information of a test signal for a VSWR test, and generate a test signal generation request that includes the determined oscillation frequency information and the power level information; a test signal generator adapted to generate, upon detecting the test signal generation request, a test signal corresponding to the oscillation frequency information and the power level information, provide the generated test signal to an antenna; and a VSWR detector adapted to receive the test signal and a reflected signal of the test signal from the antenna, and calculate the VSWR using the received test signal and the reflected signal.

To achieve the above and other objects, the present invention provides a method for testing a VSWR in a W-CDMA mobile communication system. The method comprises the steps of: determining an oscillation frequency information and a power level information of a test signal for a VSWR test upon detecting a VSWR test request; generating a test signal generation request that includes the determined oscillation frequency information and the power level information; generating a test signal corresponding to the oscillation frequency information and power level information upon detecting the test signal generation request,; providing the generated test signal to an antenna; receiving the test signal and a reflected signal of the test signal from the antenna; and calculating the VSWR using the received test signal and reflected signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
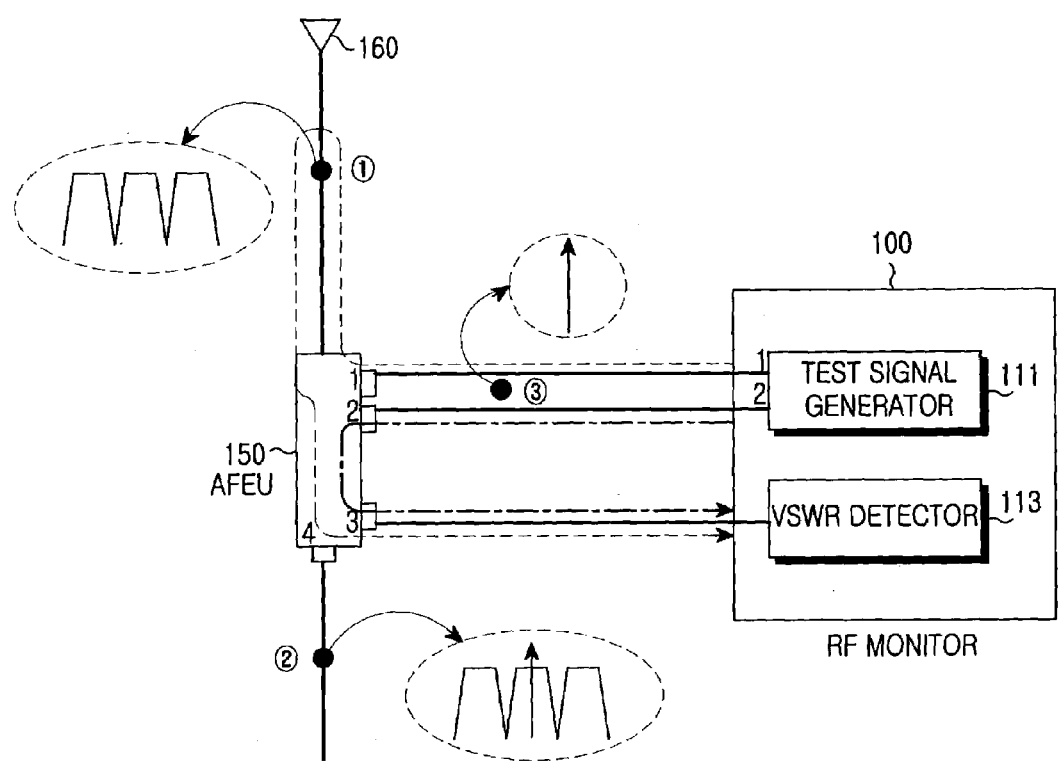
FIG. 1 is a diagram illustrating an example of a VSWR test apparatus.
Figure 2:
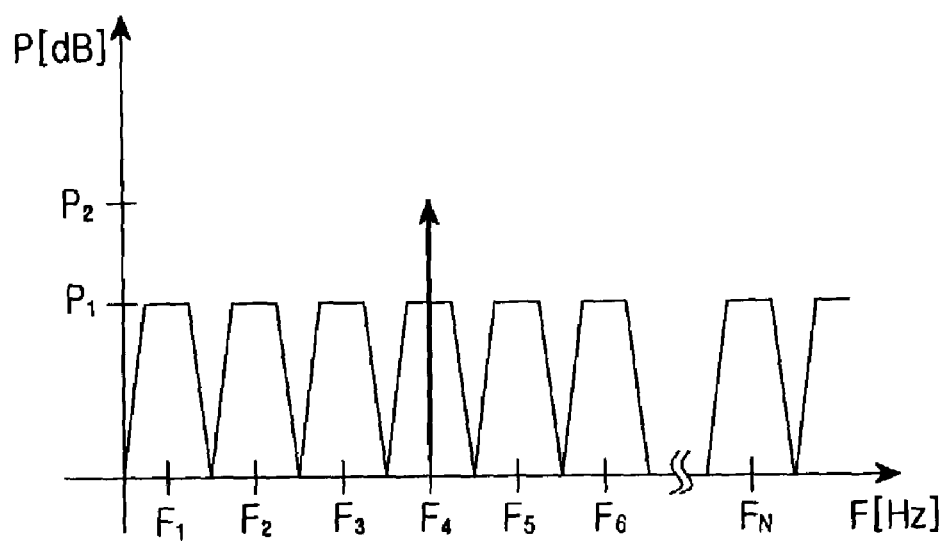
FIG. 2 is a graph illustrating an example of a VSWR test signal of FIG. 1.

Several embodiments of the present invention will now be described in detail with reference to the accompanying drawings. In the drawings, the same or similar elements are denoted by the same reference numerals. Also, a detailed description of known functions and configurations have been omitted for conciseness.

Figure 3:
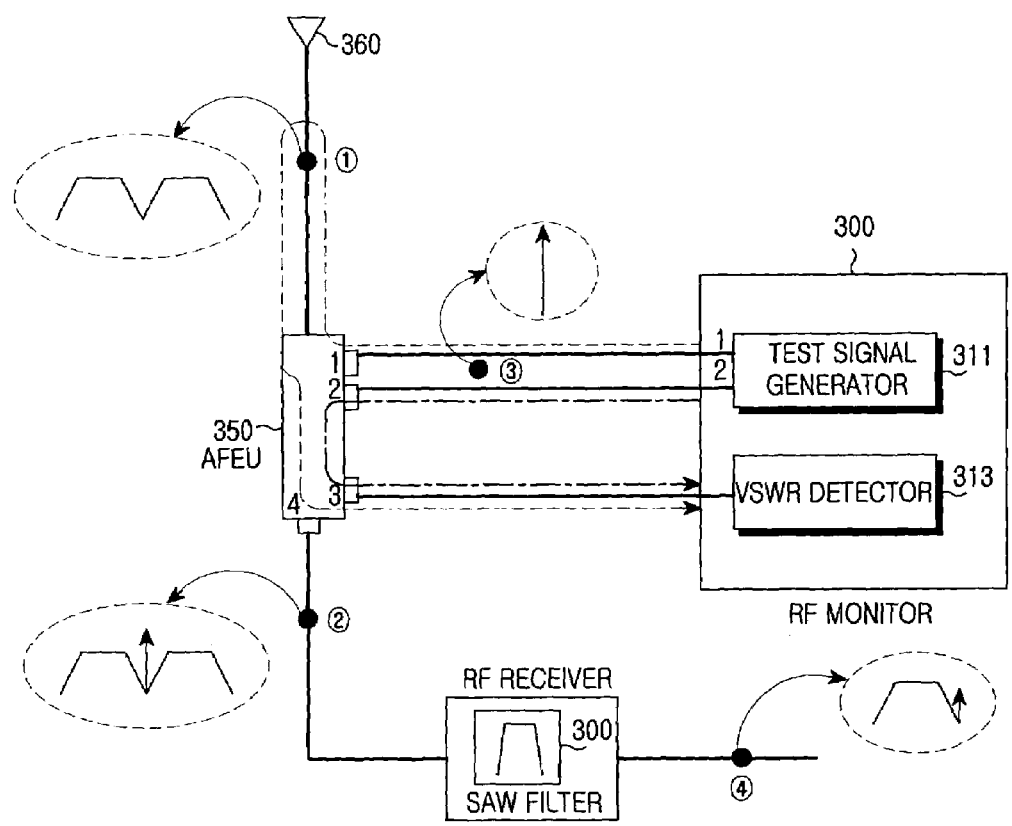
FIG. 3 is a diagram illustrating an example of a VSWR test apparatus according to an embodiment of the present invention.

FIG. 3 is a diagram illustrating an example of a VSWR test apparatus according to an embodiment of the present invention. Referring to FIG. 3, a VSWR test apparatus 300 includes a test signal generator 311 for generating a test signal for a VSWR test, a VSWR detector 313 for detecting a VSWR according to the test signal, and a controller (not shown). Upon detecting a VSWR test request for testing the VSWR, the controller provides a test signal generation request signal to the test signal generator 311. In this case, the controller determines an oscillation frequency information and a power level information, representing an oscillation frequency and a power level, respectively, at which the test signal should be transmitted. Further, the controller generates the test signal generation request signal including the determined oscillation frequency information and power level information. In addition, the controller considers the following factors in determining the oscillation frequency information and power level information used for generation of the test signal.

The VSWR test apparatus 300 of FIG. 3 is an apparatus for testing a VSWR in a W-CDMA mobile communication system. Compared with a general N-CDMA mobile communication system, the W-CDMA mobile communication system employs fewer frequency assignments (FAs). The VSWR test apparatus 300 preferably generates a test signal in a different rule as compared with the VSWR test signal used in the N-CDMA mobile communication system. That is, in the general N-CDMA mobile communication system, a VSWR test apparatus detects a currently unemployed FA, and then oscillates a test signal at a center frequency of the detected unemployed FA, for the VSWR test. However, since the W-CDMA mobile communication system, as stated above, has a limited number of FAs, it is difficult to oscillate the test signal at a center frequency of an unemployed FA. Therefore, the controller controls the test signal generator 311 to oscillate the test signal at a frequency between center frequencies of the FAs. The oscillation frequency information of the test signal generation request signal becomes the information on the frequency between center frequencies of the FAs.

In addition, the controller considers a power level satisfying the following three factors in determining the power level information.

First, in the W-CDMA mobile communication system, consideration should be taken of a noise floor level of a signal received at an antenna of a Node B. For example, assuming that a noise floor level is −108 dBm/3.84 MHz in the W-CDMA mobile communication system, the test signal is preferably transmitted at a power level of over −129 dBm/30 kHz+20 dB (return loss)=−109 dBm/30 kHz in order to transmit the test signal at a power level higher than the noise floor level.

Second, in the W-CDMA mobile communication system, consideration should be taken of a peak power level of a signal received at a Node B receiver. For example, assuming that a peak power level of a signal received at a Node B receiver is −60 dBm/3.84 MHz in the W-CDMA mobile communication system, the test signal is preferably transmitted at a power level which is higher by over −61 dBm/30 KHz than the peak power level of the received signal.

Third, in the W-CDMA mobile communication system, consideration should be taken of a data rate provided by a Node B. For example, in the case where a data rate provided by a Node B is 384 Kbps in the W-CDMA mobile communication system, sensitivity of a received signal is −106 dBm/3.84 MHz. In this case, if a resolution bandwidth (RBW) is set to 30 KHz, a power level of the test signal is preferably set to below −127 dBm/30 KHz in order not to interfere with transmission of other data.

The controller determines the power level information so that the test signal has a power level satisfying the above three factors.

Upon receiving the test signal generation request signal, the test signal generator 311 detects the oscillation frequency information and the power level information included in the test signal generation request signal, and generates a test signal in response to the detected oscillation frequency information and power level information. The generated test signal has a continuous wave (CW) format of single tones corresponding to the oscillation frequency information. Since the test signal generated by the test signal generator 311 is preferably transmitted via a first path to an antenna 360 and via a second path to the VSWR detector 313, the test signal generator 311 outputs the test signal through a first port corresponding to the first path and a second port corresponding to the second path. The test signal generated by the test signal generator 311 has a single tone format, illustratively, represented by (3) of FIG. 3.

The test signal outputted through the first port is provided to a first port of an AFEU 350, and the test signal outputted through the second port is provided to a second port of the antenna front end unit 350. The antenna front end unit 350 provides the test signal received through the first port to the antenna 360, and provides the test signal received through the second port to the VSWR detector 313 via a third port. The test signal provided to the antenna 360 is not fully transmitted. A portion of the signal is reflected due to a characteristic of a radio link. The reflected signal is provided to the VSWR detector 313 via the third port by the AFEU 350. The signal reflecting from the antenna 360 is not fully provided to the VSWR detector 313 via the third port. Rather, a portion of the signal is provided to a reception terminal via a fourth port. A signal received through the antenna 360 has a continuous wave form of FAs represented by (1) of FIG. 3. Preferably, only the FAs received over the air through the antenna 360 are provided to the reception terminal. However, as stated above, a part of the test signal for the VSWR test is provided to the reception terminal. Therefore, the FAs overlap with the test signal as, illustratively, represented by (2) of FIG. 3.

The VSWR detector 313 calculates a VSWR, using signals outputted at the third port of the AFEU 350, i.e., the test signal directly provided from the test signal generator 311 to the VSWR detector 313 and the test signal reflecting from the antenna 360 after being provided from the test signal generator 311 to the antenna 360. Since the reflected test signal is preferably not fully provided to the VSWR detector 313 but partially provided to the reception terminal, a power level of the test signal is preferably determined by considering a power level of a received signal as stated above.

As described above, since a power level of the test signal is determined considering the above-stated three conditions, the power level of the test signal may affect received signals. Therefore, in the present invention, a surface acoustic wave (SAW) filter 370 having a rejection characteristic of 70 dB is arranged at a position distanced by a prescribed frequency, e.g., 2.5 MHz, from a center frequency of each of the FAs. The SAW filter 370 filters output signals of the antenna 360 to prevent the test signal from being inserted into the reception terminal, affecting the actual communication service. After a mixed signal of the received signals and the test signal, illustratively, represented by (2) of FIG. 3, is filtered by the SAW filter 370, the actual test signal component is almost removed from the mixed signal, generating only the received signals as, illustratively, represented by (4) of FIG. 3.

Figure 4:
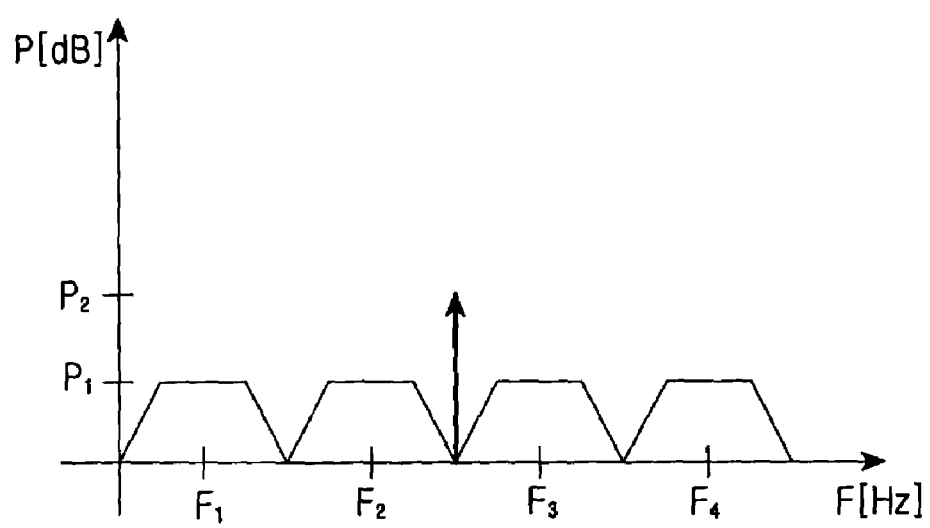
FIG. 4 is a graph illustrating an example of a VSWR test signal of FIG. 3 according to an embodiment of the invention.

FIG. 4 is a graph illustrating an example of a VSWR test signal of FIG. 3 according to an example of the present invention. Referring to FIG. 4, it is assumed that the W-CDMA mobile communication system employs 4 FAs of first to fourth FAs e.g., $FA_1$, to $FA_4$. In this case, the controller described in conjunction with FIG. 3 controls the test signal generator 311 so as to oscillate a test signal $T_1$, at a frequency between center frequencies of two particular FAs, e.g., a second FA $FA_2$ and a third FA $FA_3$. For example, if a center frequency of the second FA $FA_2$ is 2132.6 MHz and a center frequency of the third FA $FA_3$, is 2137.6 MHz, then a frequency of the test signal $T_1$, becomes 2135 MHz. In addition, if it is assumed as illustrated in FIG. 4 that the FAs have a power level of $P_1$ dB, the test signal $T_1$, has a power level of $P_2$ dB which is higher than the power level $P_1$ dB by a determined level which takes into consideration the above-stated three factors, i.e., a noise floor level of a signal received at the antenna 360, a peak power level of a signal received at the reception terminal, and a data rate provided by a Node B.

As described above, the present invention oscillates a test signal for a VSWR test at a frequency between center frequencies of adjacent FAs rather than at a center frequency of each of the FAs in a W-CDMA mobile communication system. This enables the VSWR test to not affect communication service. In addition, the present invention determines a power level of the test signal for the VSWR test and takes into consideration the power level-related information such as a power level and a noise level of a received signal in the W-CDMA mobile communication system. This prevents the VSWR test signal from interfering with other signal components. Therefore, the VSWR test signal does not affect the communication service, and contributes to the maintenance of optimal communication service quality.

While the invention has been shown and described with reference to a certain embodiment thereof, it will be understood by those skilled in the art that various changes in form and details may be made therein without departing from the spirit and scope of the invention as defined by the appended claims.

What is claimed is:

1. An apparatus for testing a voltage standing wave ratio (VSWR) in a wideband code division multiple access (W-CDMA) mobile communication system, the apparatus comprising:

a controller for determining, upon detecting a VSWR test request, oscillation frequency information and a power level information of a test signal for a VSWR test, and generating a test signal generation request including the determined oscillation frequency information and power level information, wherein the controller selects two arbitrary frequency assignments (FAs) employed in the W-CDMA mobile communication system, and defines a frequency between center frequencies of the two selected FAs as the oscillation frequency information;

a test signal generator for generating, upon detecting the test signal generation request, a test signal corresponding to the oscillation frequency information and power level information, and providing the generated test signal to an antenna; and a VSWR detector for receiving the test signal and a reflected signal of the test signal from the antenna, and calculating a voltage standing wave ratio using the received test signal and reflected signal.

2. The apparatus of claim 1, wherein the controller determines the power level information considering a noise floor level of a signal received at the W-CDMA mobile communication system, a peak power level of the received signal, and a data rate provided by the W-CDMA mobile communication system.

3. The apparatus of claim 1, further comprising a surface acoustic wave (SAW) filter for filtering the received signal at a frequency distanced by a prescribed value from a center frequency of each of the FAs.

4. The apparatus of claim 3, wherein the SAW filter rejects a power level of the test signal if the power level of the test signal is below a power level of the received signal.

5. An apparatus for testing a voltage standing wave ratio (VSWR) in a wideband coded division multiple access (W-CDMA) mobile communication system employing a plurality of frequency assignments (FAs), the apparatus comprising:

a controller for defining, upon detecting a VSWR test request, an oscillation frequency information of a test signal for a VSWR test as a frequency between center frequencies of two arbitrary FAs among the plurality of FAs, determining a power level information of the test signal, and generate a test signal generation request that includes the determined oscillation frequency information and the power level information;

a test signal generator for generating, upon detecting the test signal generation request, a test signal corresponding to the oscillation frequency information and the power level information, and providing the generated test signal to an antenna; and a VSWR detector for receiving the test signal and a reflected signal of the test signal from the antenna, and calculating the VSWR using the received test signal and the reflected signal.

6. The apparatus of claim 5, wherein the controller is further adapted to determine the power level information using a noise floor level of a signal received at the W-CDMA mobile communication system, a peak level of the received signal, and a data rate provided by the W-CDMA mobile communication system.

7. The apparatus of claim 6, further comprising a surface acoustic wave (SAW) filter for filtering the received signal at a frequency distanced by a prescribed value from a center frequency of each of the FAs.

8. The apparatus of claim 7, wherein the SAW filter rejects a power level of the test signal if the power level of the test signal is below a power level of the received signal.

9. A method for testing a voltage standing wave ratio (VSWR) in a wideband code division multiple access (W-CDMA) mobile communication system, the method comprising the steps of:

upon detecting a VSWR test request, determining oscillation frequency information and power level information of a test signal for a VSWR test, and generating a test signal generation request including the determined oscillation frequency information and power level information, wherein the oscillation frequency information is defined as a frequency between center frequencies of two arbitrary frequency assignments (FAs) selected from a plurality of FAs employed in the W-CDMA mobile communication system;

upon detecting the test signal generation request, generating a test signal corresponding to the oscillation frequency information and power level information, and providing the generated test signal to an antenna; and receiving the test signal and a reflected signal of the test signal from the antenna, and calculating a voltage standing wave ratio using the received test signal and reflected signal.

10. The method of claim 9, wherein the power level information is determined considering a noise floor level of a signal received at the W-CDMA mobile communication system, a peak power level of the received signal, and a data rate provided by the W-CDMA mobile communication system.

11. A method for testing a voltage standing wave ratio (VSWR) in a wideband coded division multiple access (W-CDMA) mobile communication system employing a plurality of frequency assignments (FAs), the method comprising the steps of:

defining an oscillation frequency information of a test signal for a VSWR test as a frequency between center frequencies of two arbitrary FAs among the FAs upon detecting a VSWR test request;

determining power level information of the test signal;

generating a test signal generation request including the determined oscillation frequency information and the power level information;

generating a test signal corresponding to the oscillation frequency information and the power level information upon detecting the test signal generation request; and providing the generated reflected signal of the test signal from the antenna; and calculating the VSWR using the received test signal and reflected signal.

12. The method of claim 11, wherein the power level information is determined using a noise floor level of a signal received at the W-CDMA mobile communication system, a peak level of the received signal, and a data rate provided by the W-CDMA mobile communication system.

* * * * *